Nov. 14, 1967     H. S. CARLSON     3,352,426
EXERCISING DEVICE
Filed July 14, 1965     2 Sheets-Sheet 1
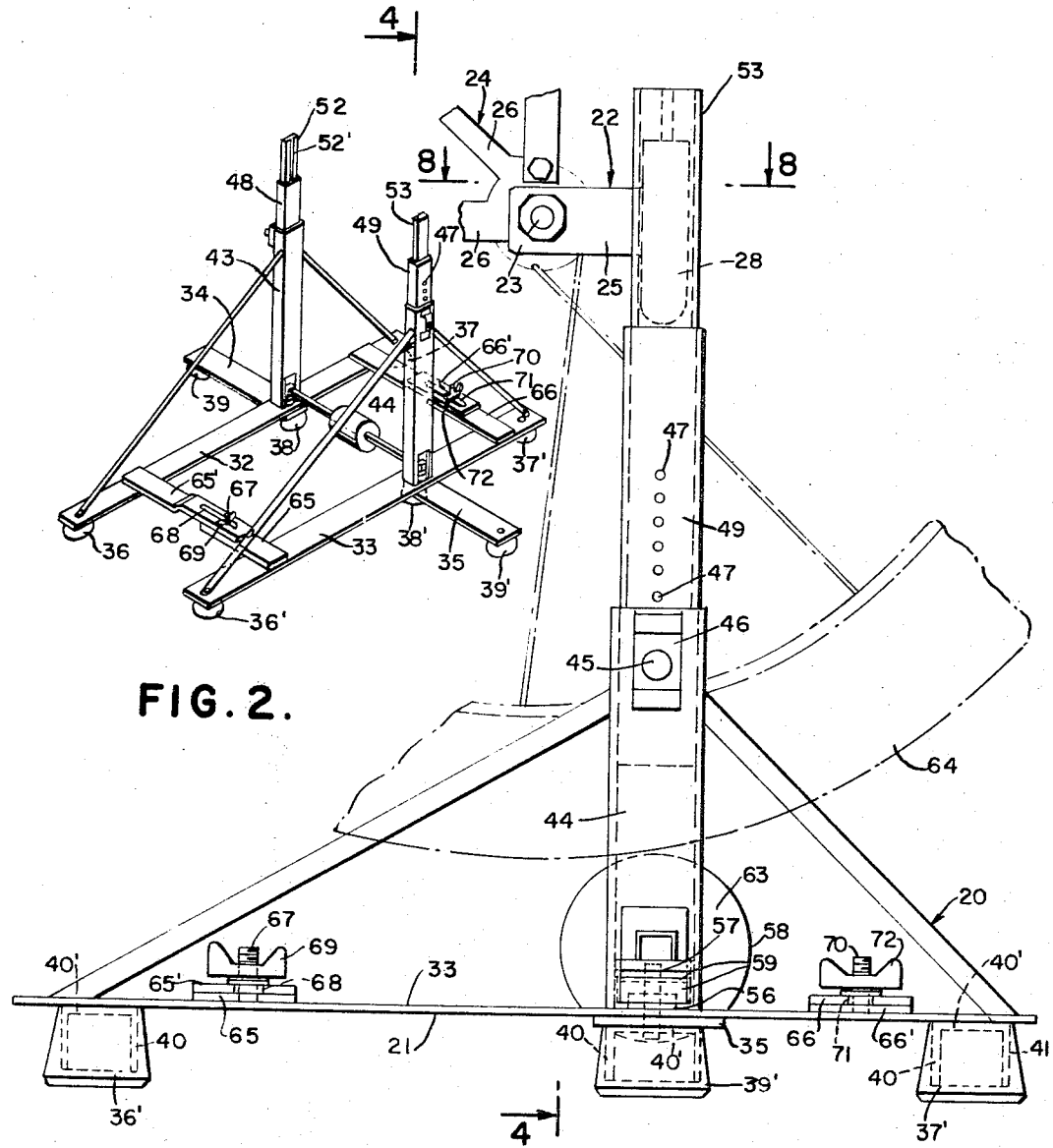
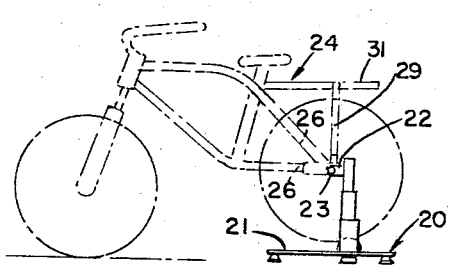
FIG. 1.
*INVENTOR*
Harold S. Carlson
BY Robert E. Kleve
*ATTORNEY*

Nov. 14, 1967  H. S. CARLSON  3,352,426
EXERCISING DEVICE

Filed July 14, 1965  2 Sheets-Sheet 2

INVENTOR
Harold S. Carlson

BY Robert E. Kleve
ATTORNEY

United States Patent Office 3,352,426
Patented Nov. 14, 1967

3,352,426
EXERCISING DEVICE
Harold S. Carlson, 147 Columbia Court,
Grand Forks, N. Dak. 55201
Filed July 14, 1965, Ser. No. 472,063
2 Claims. (Cl. 211—22)

ABSTRACT OF THE DISCLOSURE

The invention is a bicycle stand comprising a pair of elongated base frame members, one of a pair of vertical columns is mounted upright on one of said base frame members and the other mounted upright on the other of said base frame members, each column has a sleeve at its upper end. A pair of flanges are mounted to the rear axle of the bicycle on opposite sides, and the flanges have vertical rod portions adapted to be telescoped into said sleeve portions of said columns, means are provided to adjust the columns toward and away from one another, said columns each have a plurality of portions in sliding relation to one another. Spring biased pin means to lock said portions in adjusted relation, a roller is rotatably mounted between the columns and adapted to engage the underside of the tire at the rear wheel and adjustable toward and away from the wheel.

---

This invention relates to exercising equipment, more particularly, the invention relates to bicycle stands for pedalling the bicycle while the bicycle is stationary for exercise.

It is an object of the invention to provide a novel bicycle exercising stand to which a bicycle may be easily and rapidly attached and which will provide a maximum amount of support for the bicycle.

It is a further object of the invention to provide a novel bicycle stand which will cooperate to receive an attachment to a bicycle, in telescoping relation.

It is another object of the invention to provide a novel adjustable bicycle stand which may be adjusted horizontally and vertically to accommodate different size bicycles.

Further objects and advantages of the invention will become apparent as the description proceeds and when taken in conjunction with the accompanying drawings wherein:

FIGURE 1 is a side elevational view of the bicycle stand invention with the bicycle shown attached to the stand.

FIGURE 2 is a perspective view of the bicycle stand.

FIGURE 3 is an enlarged side elevational view of the bicycle stand invention, illustrating the stand and the flange attached to the rear wheel of the bicycle, with the bicycle attached to the stand.

Figure 4:
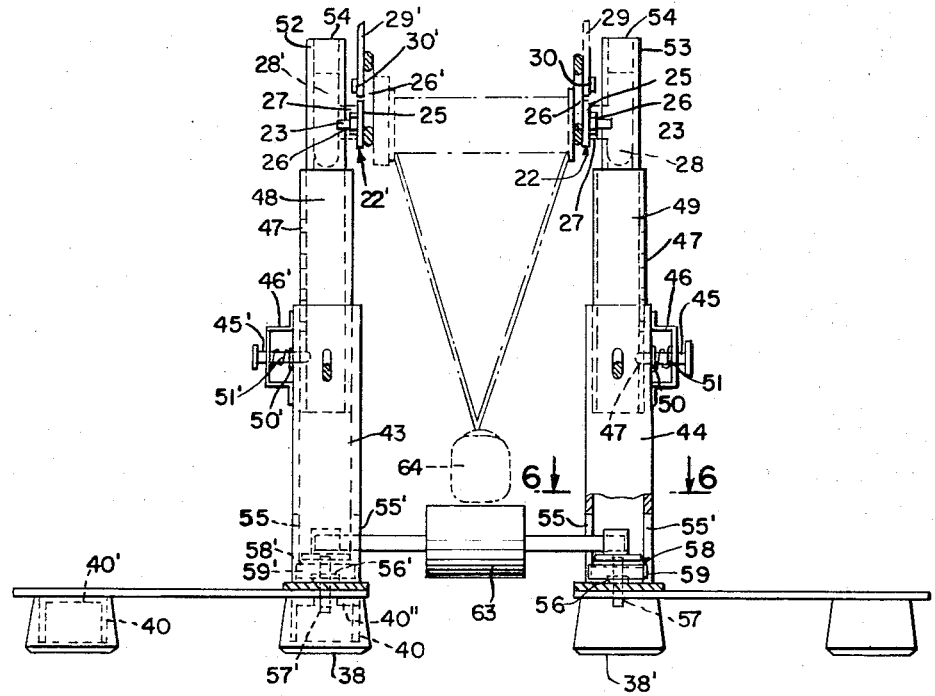
FIGURE 4 is a cross-sectional view taken along line 4—4 of FIGURE 3.
Figures 5A, 5B:
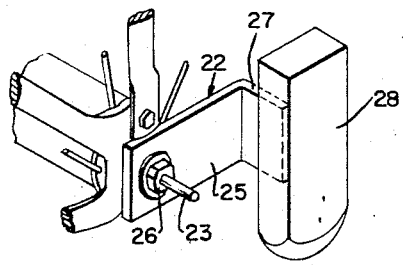
FIGURE 5A is a perspective view of the rear axle of the bicycle, and illustrating the flange attachment to the rear axle.
FIGURE 5B is a perspective view of one of the upper sleeves of the bicycle stand, adapted to receive the block of the flange attachment.
Figure 6:
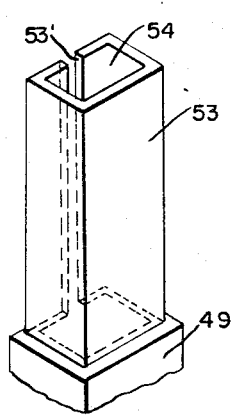
FIGURE 6 is a cross-sectional view taken along line 6—6 of FIGURE 4 and illustrating the structure for raising and lowering one end of the shaft of the roller.

Briefly stated, the invention comprises a bicycle stand having a pair of horizontal base frame members, with means to adjust the horizontal frame members toward and away from one another, a vertical column on each frame member, each having a sleeve at its upper end, a flange attachment to the rear axle on each side of a bicycle, having a vertically elongated rod on said flange, with the rod adapted to be received in said sleeve in telescoping relation, a roller extending across the lower ends of said columns adapted to engage the tire of the bicycle and adjustment means in said columns to adjust the ends of said roller, said columns each being made in a plurality of telescoping sections with spring biased means to lock said sections in an adjusted position.

Referring more particularly to the drawings in FIGURE 1, the bicycle stand invention 20 is illustrated having a bicycle stand 21, with a flange attachment 22 attached to the rear axle shaft 23 of the bicycle 24. The bicycle 24 is shown operatively installed on the stand for pedalling for exercise.

The flange attachment 22 has a mating flange attachment 22' mounted on the opposite side of the rear axle of the bicycle (see FIGURE 4). The flange attachment 22 and 22' each has horizontally and rearwardly extending flange portion 25 which has a bore to receive the shaft 23. Threaded nuts 26 are threaded onto the outer ends of the shaft 23 and tighten the flanges 22 and 22' against the frame portions 26 and 26' of the bicycle to maintain the flange portions 25 in fixed relation to the bicycle.

At the rearward end of the flange portion 25 of each flange attachment 22 and 22' is an outward extending flange portion 27. At the outer end of each flange portion 27, is a vertically extending elongated rectangular rod 28 and 28' fixed to their respective flange portion 27.

It is intended that the bicycle 24 employed can be of a conventional type, having a pair of vertical rods 29 and 29' which extend up from the frame members or portions 26 and 26' of the bicycle and which are attached thereto by bolts 30 and 30'. The rods 29 and 29' at the upper ends support a conventional carrier rock 31.

The bicycle stand 21 has a pair of elongated horizontal strap members 32 and 33 which serve as base frame members. A pair of laterally extending strap members 34 and 35 extend horizontally outward from the base frame members 32 and 33 and are fixed thereto. Eight rubber support members 36, 37, 38, and 39, and 36', 37', 38', and 39' are mounted beneath the strap members 32–35.

The rubber support members 36, 37, 36', and 37' are mounted to the outer ends of the strap members 32 and 33. The rubber support member 38 is mounted beneath strap members 32 and 34 where they intersect. The rubber support member 38' is mounted beneath the strap members 33 and 35 where they intersect.

The rubber support members 39 and 39' are mounted to the outer ends of the strap members 34 and 35.

Metal sleeves 40 are welded to the underside of strap members 32–35 to provide a mounting for the support members 36–39, and 36'–39', which rubber support members have sockets 41 to receive the sleeve 40. The sleeves 40 have capped upper ends 40' for the support members 36, 37, 39, and 36', 37', and 39', while the sleeves 40 for the support members 38 and 38' have a cap member 40" with a bore 42.

A pair of metal upright columns or sleeves 43 and 44 are mounted centrally of the length of the strap members 32 and 33 and fixed thereto. The metal columns or sleeves 43 and 44 have pins 45 and 45' on the outside of the columns. The pins 45 and 45' pass through bores in the brackets 46 and 46', which brackets are welded to the outside of columns 44 and 43, respectively. The pins 45 and 45' are adapted to engage one of the bores 47 in the central sleeves 48 and 49. The sleeves 48 and 49 are slidable within the sleeves 43 and 44 vertically in telescoping relation, and made to be slid up or down and held in position by the pins 45 and 45'.

The pins 45 and 45' have ridges 50 and 50' which limit the movement of the pins into the bores 47 and a spring 51 and 51' engages the ridge to urge the pins into engagement in the bores 47.

At the upper end of each of the central sleeve portions 48 and 49, are a pair of sleeves 52 and 53 fixed thereto. The sleeves 52 and 53 have longitudinal slots 52' and 53' contracting each other.

The elongated rods 28 and 28' of the flange attachment to the bicycle are adapted to be slidably inserted into the upper open ends 54 of the sleeves and slid downward into their position illustrated in FIGURES 3 and 4, with the longitudinal slots 52' and 53' receiving the outturned flange portions 27 of the flange attachments 22 and 22'.

The metal columns or sleeves 43 and 44 each have a dual pair of cut out portions 55 and 55' in each sleeve. A pair of threaded nuts 56 and 56' are welded to the strap members 32 and 33 adjacent the cut out portions 55 and 55' and within the sleeves 43 and 44. A pair of threaded bolts 57 and 57' are threaded into the nuts 56 and 56' respectively and project downward and freely through the bore 42 into the sleeves 40.

Disc members 58 ad 58' are fixed to the upper portion of the bolts 57 and 57', respectively, and the disc members have depending cylindrical wall portions 59 and 59' fixed thereto and depend downward freely about the nuts 56 and 56' respectively.

The upper end of the bolts 57 and 57' project into central sockets in rectangular plates 60 and 60'. The rectangular plates 60 and 60' are slidably mounted in the sleeves 43 and 44, respectively and free to slide up and down, but nonrotatably about a vertical axis. The metal plates 60 and 60' have rectangular sleeve brackets 61 and 61' fixed to their upper face, which form rectangular sleeve and receive the outer ends 62' and 62" of the rectangular shaft 62 and frictionally retain the ends of the shaft.

A roller 63 is rotatably mounted to the central portion of the shaft 62, by means of conventional roller bearings, not shown, so that the roller may relate relative to and about the longitudinal axis of the shaft 62. The roller 63 may have an outer rubber coated surface.

To raise and lower either or both ends 62' and 62" of the shaft of the roller 63, the operator will rotate the discs 58 and 58' by grasping the cylindrical wall portion 59 or 59' from opposite sides with his fingers, through either the cut out openings 55 and 55' in the sleeve 44 or the cut out openings 55 and 55' in the sleeve 43, to thereby turn either the disc 58 or 58'.

The turning of the disc member in one direction 58 and 58' threads the bolts 57 and 57', respectively, upward in their threaded nuts 54 and 54', with the upper end of the bolts 57 and 57' engaging the sockets in the plates 60 and 60' and thereby raising the plates 60 and 60', and turning the disc members 58 and 58' in opposite direction allows the plates 60 and 60' to slide downward.

Since the ends 62' and 62" of the roller shaft are fitted into the brackets on top of the plate 60 and 60', the raising and lowering of the plates 60 and 60' thereby raises and lowers the ends of the roller shaft.

The bicycle stand invention is operated in the following manner: the flange attachment 22 and 22' are attached to the rear axle shaft of the bicycle permanently, by threading on the nuts 26 over the flange portion 25. The bicycle may be driven from place to place with the flange attachments 22 and 22' installed, including the elongated rods 28 and 28', since the attachments will not protrude materially from the bicycle, nor interfere with its normal operation.

The flange attachments 22 and 22' having been attached, he bicycle may be installed in the bicycle stand by lifting the rear end of the bicycle and lowering and introducing the rods 28 and 28' into the sleeves 53 and 52 respectively through the upper open end 54. The outturned flange portions 27 will slide down the slots 53' and 52' in the sleeves until the tire 64, of the rear wheel 65 to which the axle shaft 23 is attached, engages the roller 63. When the tire 64 engages the roller 63, the bicycle will come to rest in operative position.

The operator may then climb onto the seat of the bicycle and pedal the pedals of the bicycle causing the rear wheel 65 to rotate, and the rotation of the rear wheel, in turn, rotates the roller 63.

The roller 63 may be moved upward or downward, by the disc members 58 and 58' to provide more or less friction against the tire 64, to make it more difficult or easier to pedal the bicycle, and thereby vary the exercise pattern.

The strap members 32 and 33 are adjustably connected together by a dual pair of metal straps 65 and 65', and 66 and 66'. The straps 65 and 65' have their outer ends attached to the strap members 32 and 33 respectively and their inner ends over lapping in sliding relation. A bolt 67 is fixed to the strap 65 and extends upward through an elongated slot 68 in the strap 65' and wing nut 69 is threaded onto the upper end of the bolt 67 and tightens the strap members 65 and 65' together. Similarly the strap members 66 and 66' have their outer ends attached to the strap members 32 and 33 respectively and their inner ends overlapping in sliding relation. A bolt 70 is fixed to the strap member 66 and extends upward through an elongated slot 71 in the strap 66' and a wing nut 72 is threaded onto the upper end of the bolt 70 to tighten the straps 66 and 66' together.

By untightening the wing nuts 69 and 72, the members 32 and 33 may be slid toward and away from one another, thereby moving the sleeves 52 and 53 toward and away from one another to adjust for bicycles having axles of different lengths. The wing nuts may thereafter be tightened in their adjusted position.

Also the pins 45 may be pulled outward to release the noses of the pins from the bores 47, so that the central sleeve portions 48 and 49 may be raised and lowered to different positions, and thereafter releases to allow the pin to project in a different one of the bores.

The raising and lowering of the sleeve portions 49, thereby raises and lowers the upper sleeves 52 and 53 to adjust the sleeves to bicycles having smaller or larger diameter rear wheels.

Also, the rod members 28 and 28' of the flange attachments 22 and 22' to the bicycle by being inserted into the sleeves 52 and 53 in telescoping relation, prevent the sleeves 52 and 53 from spreading out or moving relative to one another under the weight of the bicycle and operator.

Figures 7A, 7B:
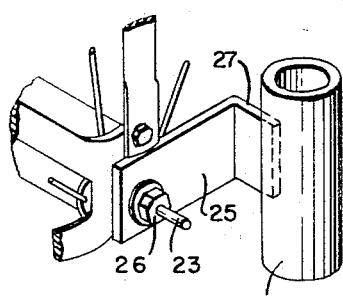
FIGURE 7A is a perspective view of a modified form of sleeve attachment to the bicycle axle.
FIGURE 7B is a perspective view of a modified form of upper sleeve for the stand adapted to receive the sleeve attachment of the bicycle shown in FIGURE 7A.
Figure 8:
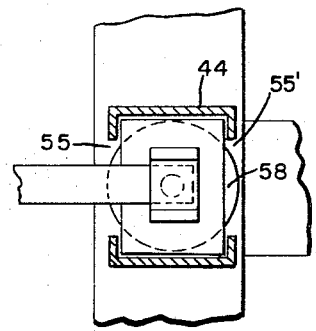
FIGURE 8 is a cross-sectional view taken along line 8—8 of FIGURE 3.

In FIGURES 7A and 7B, a modified form rod member 73 is utilized. The rod member 73 being a hollow cylindrical sleeve, which may be employed in lieu of the preferred rod member 28.

The hollow cylindrical rod member 73 is telescoped into the cylindrical sleeve 74, which has a slot 74' to receive the outturned flange portion 27. The cylindrical sleeve 74, is employed in lieu of the rectangular sleeves 52 and 53.

Thus, it will be seen that a novel adjustable bicycle stand invention has been provided which enables the bicycle to be easily and firmly and rapidly attached to the stand.

It will be obvious that various changes and departures may be made to the invention without departing from the spirit and scope thereof and accordingly it is not intended that the invention be limited as specifically described in the specification or illustrated in the drawings, but only as set forth in the appended claims wherein—

What is claimed is:

1. A bicycle stand invention comprising a pair of elongated base frame members, a pair of vertical columns with one mounted upright on one of said columns and the other mounted upright on the other of said columns, each column having a sleeve at its upper end, a pair of flanges attached to the rear axle of the rear wheel of a bicycle on opposite sides, said flanges having vertical rod portions adapted to be telescoped into said sleeve portions of said columns, means to adjust said columns toward and away from one another, said columns each having a plurality of portions in sliding relation to one another, spring biased pin means to lock said portions in an adjusted position, a roller having a shaft extending between said columns and adapted to engage the underside of the tire of the rear wheel, rotatable means within said columns and carrying the ends of said shaft with said rotatable means acting to raise and lower said shaft and thereby raise and lower said roller, rubber supports beneath said horizontal frame members, laterally extending horizontal frame members extending laterally from said first mentioned horizontal frame members and having rubber supports therebeneath.

2. A bicycle stand invention comprising a pair of elongated base frame members, a pair of vertical columns with one mounted upright to one of said base frame members and the other mounted upright to the other base frame member, each of said columns having a sleeve at its upper end, a pair of flanges adapted to be attached to the axle of the rear wheel of a bicycle on opposite sides, said flanges having vertical rod portions adapted to be telescoped into said sleeve portions of said columns, said flanges having a lateral spacing portion spacing said rod portions in rearwardly offset relation to said axle, said sleeve having a longitudinal slot to receive said lateral spacing portion when telescoping said rods into said sleeves, a roller having a shaft extending between said columns and adapted to engage the underside of the tire of the rear wheel, rotatable means within said columns and carrying the ends of said shaft with said rotatable means acting to raise and lower said shaft and thereby raise and lower said roller.

References Cited
UNITED STATES PATENTS

| | | | |
|---|---|---|---|
| 506,495 | 10/1893 | Hart | 272—73 |
| 553,373 | 1/1896 | Webber | 272—73 |
| 594,748 | 11/1897 | Le Fevre | 211—22 |
| 2,261,846 | 11/1941 | Dollinger | 272—73 |
| 3,107,915 | 10/1963 | Looney | 272—73 |

FOREIGN PATENTS 12,282   9/1894   Great Britain.

ROY, D. FRAZIER, *Primary Examiner.*

K. J. WINGERT, *Assistant Examiner.*